United States Patent Office
3,422,297
Patented Jan. 14, 1969

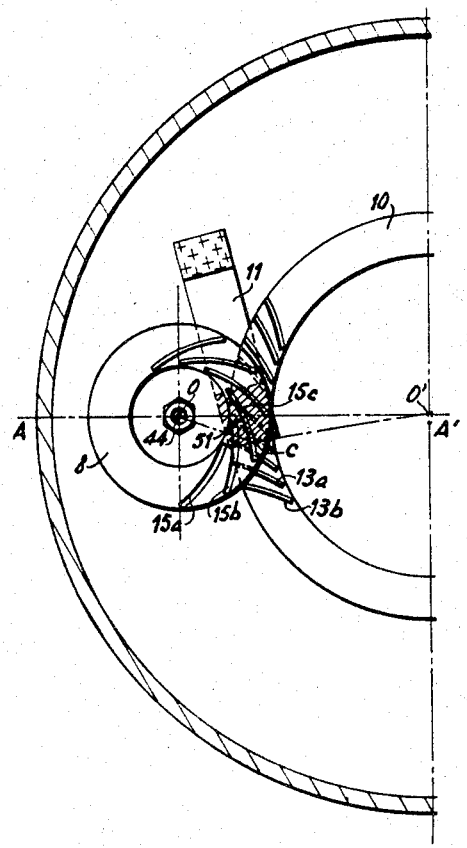
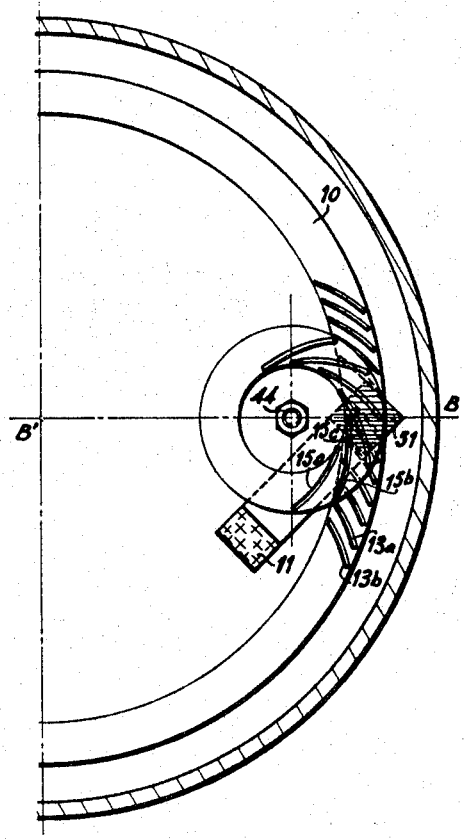
Fig. 3
Fig. 4

3,422,297
DEVICE IMPARTING A PLANETARY MOTION TO MEMBERS ENCLOSED IN A CONTROLLED MEDIUM
Michel M. Cotton de Bennetot, Brest, Pierre J. Lostis, Bagneux, and Jacques F. Simon, Paris, France, assignors to Centre National de la Recherche Scientifique, Paris, France
Filed Feb. 21, 1966, Ser. No. 528,922
Claims priority, application France, Feb. 23, 1965, 48,894; Feb. 9, 1966, 6,692
U.S. Cl. 310—80 3 Claims
Int. Cl. H02k 49/10; C23c 13/08

The present invention has for its object a device which is designed to impart a planetary motion at a comparatively high speed, to one or more members located in an enclosed space inside which the environment or atmosphere should not be disturbed.

It is another object of the invention to provide a vacuum depositing apparatus which includes such a device.

It was previously known, in view of depositing a uniform layer of a material on a workpiece, to place the latter in an evacuated enclosure in proximity of a source adapted for diffusing said material within a predetermined solid angle inside said enclosure, and to rotate the workpiece around an axis, the source position being suitably offset with respect to the said axis. The suitable source position was determined through application of Lambert's law.

This prior art method cannot be applied for coating several workpieces in a single depositing operation.

Accordingly, it is an object of the invention to provide a device which is adapted for imparting to the workpieces to be coated, which are placed within an evacuated enclosure, a planetary motion which constantly keeps them within the said solid angle of diffusion of the material from the source, this device yet operating without disturbing the void inside the enclosure.

Obviously one could design for that purpose, devices including conventional gearing. However, due to the fact that the gears thereof will be subjected to friction and lubrication, the atmosphere within the enclosure would be disturbed through exhaust of the gas occluded in the metal of the gears and vapors given off by the lubricant.

The device according to the invention comprises, located within an enclosure the internal atmosphere of which is controlled, a rotary plate provided, at the periphery thereof, with bearings which support idle shafts in turn driving rigidly locked thereto, the members to which a planetary motion is to be imparted, and at least one magnetic gearing including a first gear mounted on the rotation axis of the plate and at least one further gear mounted on the said idle shafts.

According to an important feature of the invention, the said magnetic gearing conforms to the type disclosed in the U.S. Patent 3,368,092 filed on June 12, 1964, in the name of "Societe d'Etudes et de Recherches Magnetiques" for: "A Magnetic Power Transmission Device."

Such a magnetic gearing includes a gear and a pinion both having plane surfaces perpendicular to their rotation axes and partly facing each other, elongated soft magnetic projections, so arranged on the said plane surfaces that the pinion magnetic projections successfullly come in facing position with respect to the gear magnetic projections in a region which is offset with respect to the center line of the pinion and gear, the respective magnetic projections of the pinion and of the gear defining therebetween constant air-gaps which are parallel to the said rotation axes and means, cooperating with the said magnetic projects, for generating in the said air-gaps a unidirectional magnetic field, said magnetic gearing including the feature that the magnetic projections are substantially radial on the gear, whereas they are substantially inclined with respect to the radial direction on the pinion.

According to a preferred embodiment of the present invention, the said means for generating a magnetic field essentially consist of at least one permanent magnet having polar ends facing the said offset region.

The invention will be more clearly understood with reference to the following description and to the appended drawings, wherein:

FIG. 1 diagrammatically shows, in half-section along AA' of FIG. 2, an apparatus according to the invention which is more particularly designed for effecting a deposit under vacuum;

FIG. 3 is a half-top plan view of a magnetic gearing which is included in the apparatus of FIG. 1;

FIG. 4 is a half-top plan view of a magnetic gearing which is included in the apparatus of FIG. 2;

Figure 1:
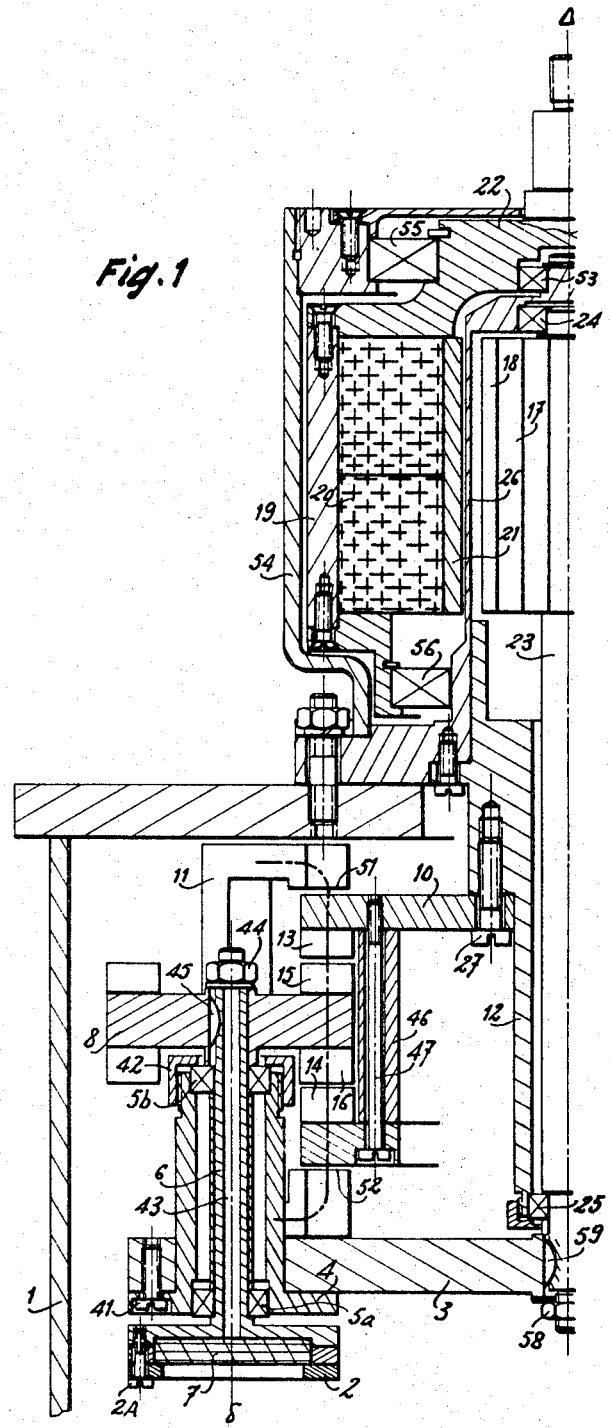

In the drawings, only one half of the apparatus has been shown, the apparatus being illustrated as cut out by a vertical plane containing its axis of symmetry Δ.

The apparatus shown in FIGS. 1 and 3 includes, located within an evacuated enclosure 1 which contains one (or more) source(s) of a material to be deposited, a rotary plate 3 and a magnetic gearing comprising a stationary gear 10 centered on the rotation axis Δ of plate 3.

Only the upper part of the enclosure has been shown in FIGS. 1 and 3. In the lower part of the enclosure are located the sources, not shown.

The plate 3 is provided, at its periphery, with one or a plurality of bearing pairs. One such pair 5a–5b has been shown, in which is mounted an idle shaft 6 having a rotation axis δ. The shaft 6 has a lower flange on which is removably mounted—for instance by means of a ring 2 and a screw 2A—a member 7 on which a deposit is to be made.

The shaft (or shafts) 6 is rotated about the axis δ by a pinion 8 of the magnetic gearing and, besides, rotated about the axis Δ, as will be explained hereinafter. It results that the member 7 finally effects a planetary motion.

Those skilled in the art are capable of properly mounting the bearing pairs around plate 3 and the shaft(s) 6. As an example, it appears on the drawing that the bearings 5a and 5b (FIG. 1) are fitted in a sleeve 4 in turn fixed to plate 3 by means of a screw 41. A pin 42 locks the bearing 5b.

The shaft 6 and pinion 8 are rigidly locked together by means of a rod 43, a nut 44 and a pin 45.

The stationary gear of the magnetic gearing includes two annular members 9 and 10 made of a soft magnetic material and provided, along the periphery of their facing surfaces, with soft magnetic material projections, such as 13 and 14. The projections are substantially epicycloidal and their directions the substantially radial.

They are more clearly apparent in 13a–13b, FIG. 3.

Member 10 is fixed, by means of a screw 27, to a hollow shaft 12 in turn fixed, by means of a screw 28, to the top of enclosure 1. Member 9 is rigidly locked to member 10 by means of soft magnetic members, such as 46, and screws, such as 47.

The pinion 8 is provided, along the periphery of each face thereof, with soft magnetic epicycloidal projections such as 15 and 16 (15a, 15b, 15c, FIG. 3).

These projections are substantially inclined with respect to the radial directions of the pinion in such a way that, when the pinion rotates about axis Δ, each of its projections will substantially come and face the projections of the facing surface of the fixed gear, as will be explained in detail hereinafter.

Figure 5:
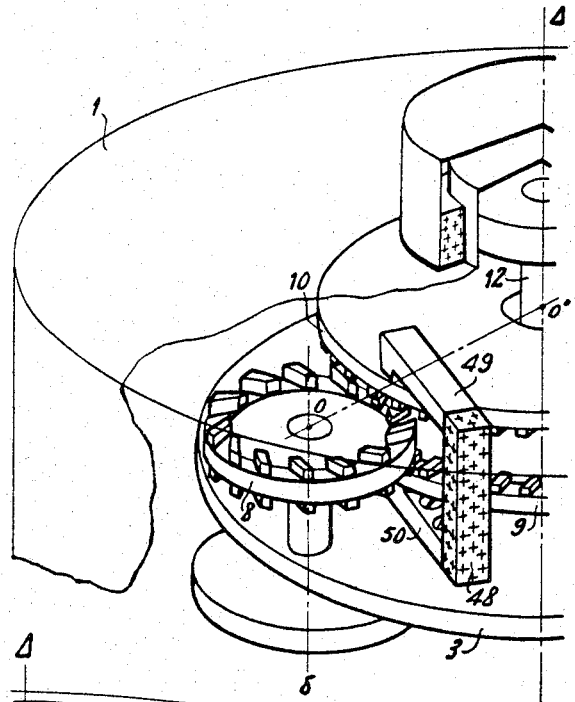
FIG. 5 is a half-view, in perspective, of the apparatus of FIGS. 1 and 3.
Figure 6:
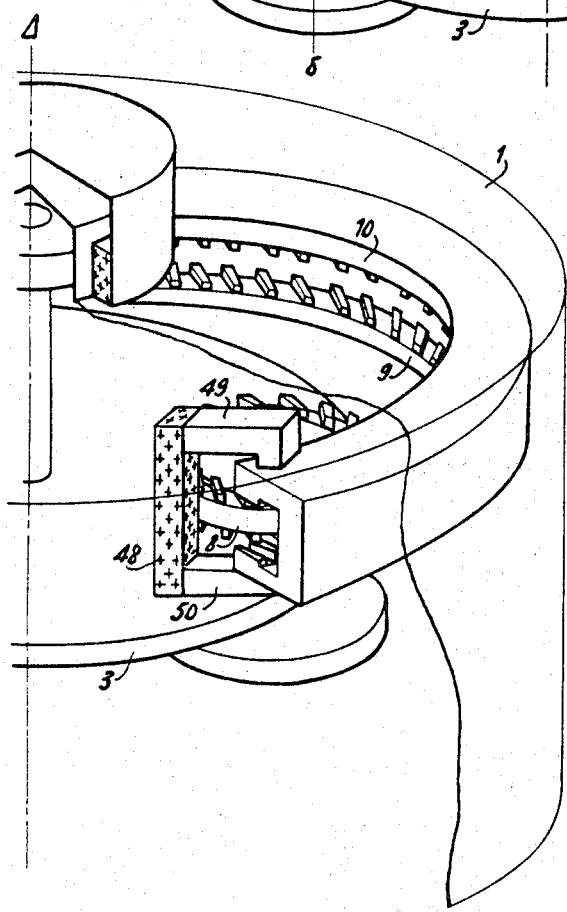
FIG. 6 is a half-view, in perspective, of the apparatus of FIGS. 2 and 4.

A unidirectional magnetic field, a line of force of which has been shown in dash-and-dot line on FIG. 1, is generated by a permanent magnet 11 generally shaped as a "C." As an example, the magnet will consist of a permanent magnet bar 48 extended by soft magnetic members 49 and 50, as shown on FIG. 5. The polar end surfaces 51 and 52 of the magnet are located opposite the "active region" of the magnetic gearing, as shown on FIG. 3, whereas the bar 48 is located outside the said region.

For this purpose, the magnet is located in a vertical plane which is inclined with respect to the center line OO'. The polar end 50 is fixed to plate 3, for instance by sticking or by means of screws, whereas the polar end 51 is displaced above the fixed member 10 (FIG. 5).

The plate 3 is, according to the non limitative embodiment shown on the drawing, rotated by means of a magnetic coupling having a driving member located outside the enclosure.

This coupling has a driven member comprised of a soft magnetic annular sleeve 17 provided, along its periphery, of projections, such as 18, and a driving member comprised of a soft magnetic annular sleeve 19 located concentrically around sleeve 17.

The annular sleeve 17 includes permanent magnets, such as 20, extended by projecting teeth, such as 21, made of a soft magnetic material. A yoke 22 closes the magnetic circuit formed by the sleeves 17–19, through the air-gaps between the said sleeves.

The yoke 22, with which the sleeve 17 is rigidly locked, is rotated by means of a motor, not shown, mounted on a shaft 53. The yoke is supported in bearings 55 and 56. The bearing 55 is fixed in a casing 54, in turn rigidly locked, by means of screw-bolts 57, to a wall 26 of the enclosure 1. The said wall divides the driving and driven members of the magnetic coupling. The bearing 56 is fixed to the wall 26.

A shaft 23, rigidly locked with the annular sleeve 17, rotates the plate 3, with which it is rigidly locked by means of a nut 58 and a pin 59.

The shaft 23 is supported in a bearing 24 in turned secured to the hollow shaft 12.

The operation of the apparatus is as follows:

The member 17 of the magnetic coupling is driven into rotation by the magnetic attraction forces which are exerted thereon by the driving member 19, when the latter is rotating.

The magnetic coupling provides a convenient solution to the problem of driving the shaft 23 and, consequently, the plate 3, at a comparatively high rotation speed, while avoiding any disturbance of the enclosure's atmosphere. Such disturbance will occur, as explained hereinabove, should one use a conventional transmission mechanism.

However, it is to be noted that the problem could also be solved through the use of an electromagnetic coupling or of any other device having no mechanical passage through the enclosure. One could even directly drive the shaft 23 by means of a special motor adapted for operation under vacuum or ultra-vacuum, known motors of that type not disturbing the medium within which they operate.

When the plate 3 rotates, pinion 8 in turn is rotated about axis Δ, which modifies the relative position of the respective projections of the pinion (15a–15b–15c, FIG. 3) and of the fixed gear 10 (13a, 13b).

It can be shown that the resulting variation in the magnetic attraction force exerted between the respective projections has the effect of rotating the pinion about its axis δ, at a velocity which depends, on the one hand, of the multiplication ratio of the magnetic gearing and, on the other hand, of the velocity of rotation of the pinion about axis Δ.

Thus, there is finally obtained a planetary motion of the shaft 6 and, consequently, of the member 7.

This planetary motion provides uniformity of the layer of material which is deposited on the surface of member 7, provided that the source be suitable positioned for that purpose, in compliance with Lambert's law.

A more detailed analysis of the operation of the magnetic gearing 8–10, made with reference to FIG. 3, will show that the pinion projections successively come opposite successive projections on the fixed gear: each pinion projection is displaced along the whole length of the corresponding gear projection, in such a way that the cooperating projections are facing each other during most of the rotation pitch.

The "meshing" (without any mechanical engagement) always takes place in the same region of the fixed gear, and the said region has been designated hereinabove as the "active region" of the gearing.

According to a feature of the invention, the flux of the magnet enters into the gearing only through the said active region, which is located outside the center line OO'.

C being the middle point of the active region, it is apparent that the triangle O'CO is rotated about O' just in the same way as the pinion 8. Therefore, the magnet 11 should itself be rotated about O', and this is effectively obtained through the locking of the magnet with plate 3.

Due to this feature of the invention, the magnet does not generate, within the magnetic gearing, any attraction force applied in regions in which it could have the effect of opposing to the pinion's motion.

It will be emphasized that the magnetic gearing which is used in the apparatus has the remarkable feature of having a multiplication (or reduction) ratio which is independent of the ratio of the respective diameters of the pinion and the gear. The said multiplication ratio can—in particular—be much higher than the said diameter ratio, this being obtained by providing the gear with a number of projections much higher than that of the pinion. This is possible even when the pinion and gear have diameters which do not differ much one from another. This feature is particularly advantageous when it is desired to obtain high velocities of rotation within a small enclosure.

It will be observed that the magnetic gearing which has been described hereinabove correctly operates independently of the ambient pressure and of temperature— in a range extending from the very low temperatures to about 600° C. It results that it can be used in vacuum techniques—and, more generally, in environments in which a conventional gearing would be unusable—for transmitting powers as high as 100 and even 1000 CV.

As a non limitative example, the plate 3 can be rotated at 500 revolutions per minute and the magnetic gearing can have a multiplication ratio of 10.

Figure 2:
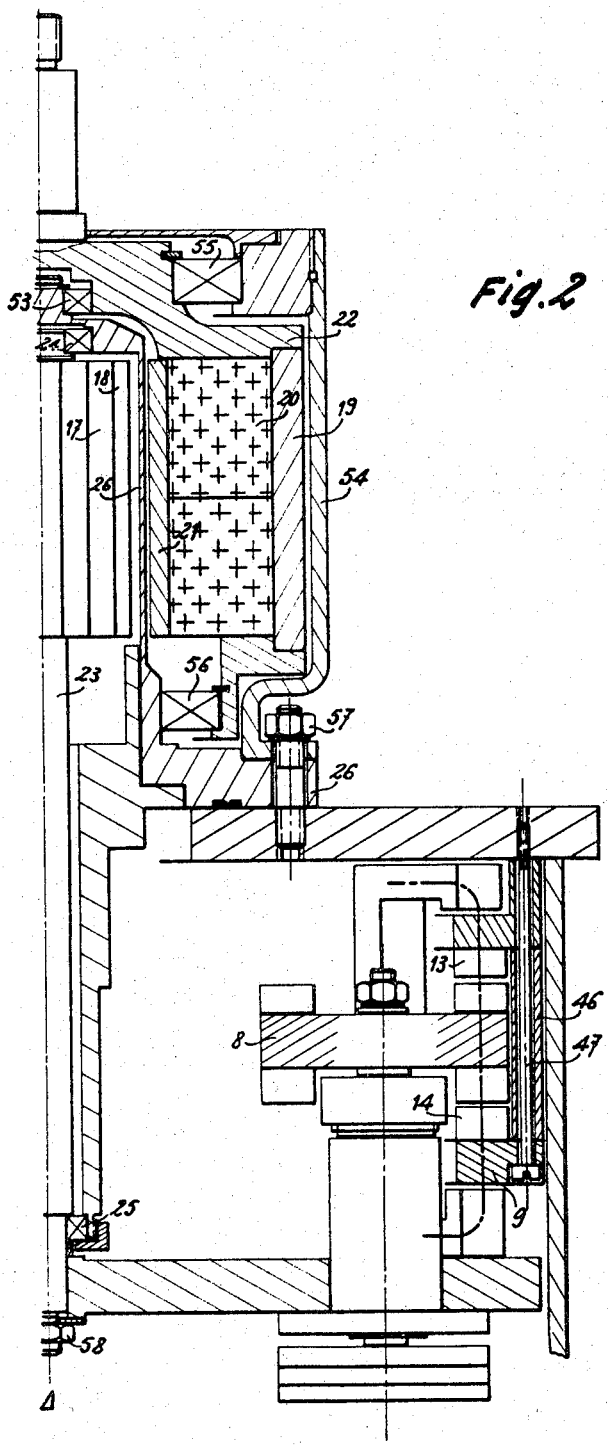
FIG. 2 shows a modification of said apparatus in half-section along BB' of FIG. 4.

In the modified embodiment which is shown, in a simplified way, on FIGS. 2 and 4, and which will be more easily built for certain values of the multiplication ratio, the fixed gear 9–10 "meshes" with pinion 8, not on the side of the said pinion which is closer to axis Δ, as is the case in the embodiments of FIGS. 1 and 3, but on the opposite side.

The projections 13 and 14 of the gears are then shaped as portions of a hypocycloid.

It is to be understood that the gear 9–10, instead of being stationary as disclosed hereinabove, could be rotated comparatively slowly about its axis: this will provide a multiplication ratio different from the ratio of the respective numbers of projections on the gear and on the pinion.

Another modification will consist in filling the intervals between the adjacent projections on the gear and on the pinion with a non magnetic material, so as to provide the facing parts of the gear and pinion with plain surfaces: this will avoid the projections to cause any turbulence in the enclosure's atmosphere.

Though the invention has been more particularly disclosed with reference to a vacuum depositing apparatus, it is to be understood that it could be applied to any device for imparting a planetary motion to members enclosed in a controlled gaseous or liquid medium.

What is claimed is:

1. A device for imparting a planetary motion to at last one member supported within an enclosure containing a controlled medium, said device comprising, mounted within the said enclosure: a rotating shaft; a plate mounted on said rotating shaft; at least one bearing mounted at the periphery of said plate; an idle shaft journalled in said bearing; means for rigidly locking said member and said idle shaft together and a magnetic gearing including at least one annular magnetic gear concentrically mounted about said rotating shaft and a magnetic pinion mounted on said idle shaft and cooperating with said annular magnetic gear.

2. A device for imparting a planetary motion to at least one member supported within an enclosure containing a controlled medium, said device comprising, mounted within the said enclosure: a rotating shaft; a plate mounted on said rotating shaft; at least one bearing mounted at the periphery of said plate; an idle shaft journalled in said bearing; means for rigidly locking said member and said idle shaft together and a magnetic gearing including at least one annular magnetic gear concentrically mounted about said rotating shaft and a pinion mounted on said idle shaft and cooperating with said annular gear, said annular gear being rigidly locked with said enclosure, said pinion and gear both having plane surfaces perpendicular to said rotating shaft and partly facing each other; soft magnetic elongated projections being so arranged on the said plane surfaces that the magnetic projections on the pinion successively come in facing position with respect to the magnetic projections on the gear in a region which is offset with respect to the center line of the pinion and gear, the cooperating magnetic projections on the pinion and the gear defining therebetween constant air-gaps which are perpendicular to the said plane surfaces; said magnetic gearing further including means, cooperating with the said magnetic projections, for generating in the said air-gaps a unidirectional magnetic field, the magnetic projections being substantially radial on the gear, whereas they are substantially inclined with respect to the radial directions on the pinion.

3. A device as claimed in claim 2, wherein the said means for generating a magnetic field essentially consist of at least one permanent magnet having polar ends facing the said offset region.

References Cited

UNITED STATES PATENTS 3,301,091  1/1967  Reese _____ 310—38

J D MILLER, *Primary Examiner.*

G. NUNEZ, *Assistant Examiner.*

U.S. Cl. X.R.

310—96, 103; 74—660